US007845302B2

(12) United States Patent
Loui et al.

(10) Patent No.: US 7,845,302 B2
(45) Date of Patent: *Dec. 7, 2010

(54) VENTILATED FLOW INTERRUPTER STEPPED HULL

(75) Inventors: Steven Loui, Honolulu, HI (US); Scott Yamashita, Honolulu, HI (US); Mealani Parish, Mililani, HI (US)

(73) Assignee: Navatek, Ltd., Honolulu, HI (US)

( * ) Notice: Subject to any disclaimer, the term of this patent is extended or adjusted under 35 U.S.C. 154(b) by 262 days.

This patent is subject to a terminal disclaimer.

(21) Appl. No.: 12/050,565

(22) Filed: Mar. 18, 2008

(65) Prior Publication Data

US 2008/0156246 A1    Jul. 3, 2008

Related U.S. Application Data

(63) Continuation-in-part of application No. 11/511,253, filed on Aug. 29, 2006, now Pat. No. 7,380,514, which is a continuation-in-part of application No. 11/315,304, filed on Dec. 23, 2005, now Pat. No. 7,311,059, and a continuation-in-part of application No. 11/294,416, filed on Dec. 6, 2005, now Pat. No. 7,299,763.

(51) Int. Cl.
*B63B 1/32* (2006.01)

(52) U.S. Cl. .................................. 114/291
(58) Field of Classification Search ............ 114/284, 114/285, 288, 290, 291
See application file for complete search history.

(56) References Cited

U.S. PATENT DOCUMENTS

| | | | |
|---|---|---|---|
| 1,265,035 A | 5/1918 | Bazaine | |
| 1,665,149 A | 4/1928 | Van Wienen | |
| 2,172,674 A | 9/1939 | Frost | 114/288 |
| 2,753,135 A | 7/1956 | Gouge | 244/106 |
| 2,928,365 A | 3/1960 | Moon | 114/145 |
| 3,146,752 A | 9/1964 | Ford | 114/67 |
| 3,327,671 A | 6/1967 | Comins | 114/285 |
| 3,528,380 A | 9/1970 | Yost | 114/66.5 |
| 3,561,389 A | 2/1971 | Hunt | 114/66.5 |
| 3,662,700 A | 5/1972 | Roumejon | 114/67 |
| 3,709,179 A | 1/1973 | Payne | 114/66.5 |
| 4,067,286 A | 1/1978 | Stout et al. | 114/283 |
| 4,371,350 A | 2/1983 | Kruppa et al. | 440/69 |
| 4,649,847 A | 3/1987 | Tinkler et al. | 114/39 |
| 4,682,560 A | 7/1987 | Lieb et al. | 114/343 |
| 4,685,889 A | 8/1987 | Nystrom | 440/69 |
| 4,689,026 A | 8/1987 | Small | 440/66 |
| 4,713,028 A | 12/1987 | Duff | 440/61 |
| 4,821,663 A | 4/1989 | Schad | 114/43 |
| RE33,165 E | 2/1990 | Whitehead | 440/69 |
| 4,907,520 A | 3/1990 | Pipkorn | 114/61 |
| 4,915,668 A | 4/1990 | Hardy | 440/69 |
| 4,924,792 A | 5/1990 | Sapp et al. | 114/61 |
| 4,926,771 A | 5/1990 | Hull | 114/289 |
| 4,977,845 A | 12/1990 | Rundquist | 114/289 |
| 5,111,767 A | 5/1992 | Haines | 114/288 |

(Continued)

*Primary Examiner*—Stephen Avila
(74) *Attorney, Agent, or Firm*—Fitzpatrick, Cella, Harper & Scinto

(57) ABSTRACT

A boat hull has at least one generally transverse ventilation step formed in at least a part of its bottom planing surface open to the water. The step has a forward edge portion and a water flow interrupter is positioned to project downwardly from the hull forward of the forward edge of the step.

15 Claims, 8 Drawing Sheets

U.S. PATENT DOCUMENTS

| | | | |
|---|---|---|---|
| 5,158,033 A | 10/1992 | Evans | 114/289 |
| 5,193,478 A | 3/1993 | Mardikian | 114/286 |
| 5,415,120 A | 5/1995 | Burg | 114/67 |
| 5,588,389 A | 12/1996 | Carter, Jr. | 114/271 |
| 5,970,898 A | 10/1999 | Pereira | 114/55.5 |
| 6,006,689 A | 12/1999 | Olofsson | 114/285 |
| 6,125,781 A | 10/2000 | White | 114/288 |
| 6,164,235 A * | 12/2000 | Hoppe | 114/275 |
| 6,213,824 B1 | 4/2001 | Small | 440/68 |
| 6,216,624 B1 | 4/2001 | Page | 114/145 |
| 6,250,246 B1 | 6/2001 | Hubley | 114/288 |
| 6,406,341 B1 | 6/2002 | Morejohn | 440/69 |
| 6,425,341 B1 | 7/2002 | Devin | 114/288 |
| 6,604,478 B2 | 8/2003 | Barsumian | 114/67 |
| 6,684,807 B1 | 2/2004 | Smith | 114/286 |
| 2002/0174818 A1 | 11/2002 | von Wolske | 114/286 |

* cited by examiner

VENTILATED FLOW INTERRUPTER STEPPED HULL

This application is a continuation-in-part of U.S. patent application Ser. No. 11/511,253 filed Aug. 29, 2006 now U.S. Pat. No. 7,380,514 which is a continuation in part of U.S. patent application Ser. Nos. 11/294,416, filed Dec. 6, 2005 now U.S. Pat. No. 7,299,763 and 11/315,304, filed Dec. 23, 2005 now U.S. Pat. No. 7,311,059. The disclosures of such applications are incorporated herein by reference.

SUMMARY OF THE INVENTION

The present invention relates to boat hulls and more in particular to boat hulls having ventilated stepped hulls wherein the steps separate the hull from the surface of the water and allow air to flow beneath the hull to unwet the hull.

BACKGROUND OF THE INVENTION

Field of the Invention

Watercraft speed efficiency is achieved by reducing watercraft drag and improving the efficiency of the propulsion system. The result is higher speeds for the same amount of power used or less power needed to achieve the same speed.

One technology developed to accomplish this goal is the use of transverse steps or aeration recesses in the bottom or planing surface of a boat's hull which open to the atmosphere at the sides of the boat to unwet part of the bottom of the boat's hull and allow airflow under the hull to reduce drag. Such steps can extend all across the hull or only partly under the hull towards the keel. In addition successive transverse steps may be provided along the length of the hull.

The effects of installing steps into the hulls of planing vessels are well known. Steps have the advantage of causing separation in the water flow beneath the hull, allowing for a portion of the hull to remain dry at high speeds. By allowing a portion of a hull to be dry or unwetted, two things are gained: increased efficiency due to unwetting of a portion of the hull and controlled placement of the center of pressure of the hull. The unwetting of the hull increases efficiency simply by reducing the total area of the hull touching the water. Since drag is directly proportional to area, the drag is reduced. Efficiency can be thought of as the ratio of lift to drag, thus by reducing drag, efficiency is increased.

The center of pressure of a hull can be thought of as the integral of the moment produced by the hull broken into infinitesimally small segments divided by the integral of the force produced by the hull broken into infinitesimally small segments. At a given speed, the boat will equalize so that the center of pressure is directly beneath the center of gravity of the boat. By changing the step size and placement, the equilibrium point will occur at different angles of attack of the vessel. Thus, by changing the center of pressure location (for a given angle of attack), the designer can change the running trim of the vessel. Moving the center of pressure allows the longitudinal center of gravity (LCG) of a hull to be changed and moved forward. Moving the LCG in conventional planning hulls improves seakeeping by reducing motions in waves, especially pitch.

Transom mounted flow interceptors such as shown in U.S. Pat. No. 6,006,689, also have been found to reduce hull drag by providing lift which reduces hull immersion in the water. Reducing hull drag improves watercraft seakeeping and propulsive efficiency by providing trim control forces to achieve the optimal watercraft trim (which varies with speed), watercraft weight and sea conditions. Such systems are usually mounted directly at the transom, which creates large trimming moments that can push the bow down and create an adverse trim condition.

By placing an obstruction, such as a flow interceptor or other form of flow interrupter, perpendicular to the flow, a stagnation region on the hull can be achieved. By generating this high pressure stagnation region, a vertical force on the hull is generated behind the interceptor and, at sufficient speed, water separation occurs.

Interceptors have successfully been implemented to control trim in vessels by generating moments at desired locations along the length of the vessel. Interceptors have the desirable behavior of being dynamically neutral regardless of their placement on a hull. A typical lifting surface is only dynamically stable if it is placed aft of the center of gravity of a vessel. If a lifting surface is placed forward of the center of gravity, movement of the vessel will be amplified by the lifting surface. An interceptor, however, is independent of vessel motion. It produces, in general terms, the same amount of lifting force regardless of the vessel motion.

In the parent applications identified above it was disclosed that by using a flow interceptor in a novel position on a hull at the leading edge of a hull's ventilating propulsion tunnel, entrapment tunnel, or rocker, improved control of water flow and propulsive efficiency were achieved.

The use of cambered lifting surfaces on boat hulls also has known advantages. Cambered shaped lifting surfaces are a form of flow interrupter and, when added to the bottom of a hull, inline with the flow, increased vessel efficiency and center of pressure placement also can be achieved. The cambered lifting surface, in essence, acts as the underside of a hydrofoil. By redirecting the flow along the hull, an amount of circulation is achieved, along with a slight area of stagnation, producing a positive pressure along the hull. This pressure integrates into a vertical force on the hull. Cambered lifting surfaces have been shown to produce lift to drag ratios much higher than that of typical prismatic planing surfaces.

The use of wedge shapes on the bottoms of boat hulls also provides a flow interrupter and is known to produce increases in efficiencies similar to those of interceptors and cambered lifting surfaces. A protrusion into the flow at high enough speed will produce a region of high pressure forward of the protrusion. The high pressure region, in turn, produces a vertical force on the hull. If the protrusion is deep enough, and the speed high enough, separation will occur behind the protrusion. Depending on the shape, the depth into the flow, the speed, and the trailing edge's ability to ventilate to the free surface, the levels of force and separation will vary.

It is an object of the present invention to provide increased efficiency of a planing vessel under different loading conditions and in different sea conditions.

It is a further object of the present invention to provide such increased efficiency through the effective control of vessel trim and through the development of lift under the vessel by the creation of stagnation points.

It is an object of the present invention to increase dynamic lift in hulls.

A still further object of the present invention is to provide a protrusion, located forward of a pre-existing ventilation step in a planing hull bottom to generate a high pressure region forward of said step.

Yet another object of the present invention is to increase the unwetted portion of the hull thus increasing the overall efficiency of said hull.

It is another object of the present invention to increase the speed range over which water separation from the hull occurs, thus increasing the efficiency of the vessel over a wider speed range.

BRIEF DESCRIPTION OF THE INVENTION

In accordance with an aspect of the present invention the trim of a watercraft hull or vessel is efficiently and effectively managed by controlling the forces applied to and the wetted surface area of the underwater body, bottom or working, planing surface of a stepped planing hull.

In accordance with another aspect of the present invention, the efficiency of operation of a planing vessel or watercraft with a stepped hull is improved by adding a protrusion or flow interrupter into the water flow beneath the hull. The inclusion of the protrusion into the flow will increase the efficiency of the vessel at moderate to high speeds. Adding such a protrusion into the water flow in front of a ventilation step formed on the bottom of a planing vessel can improve on the overall design of said vessel.

The inclusion of a protrusion or flow interrupter forward of such steps provides all of the positive effects of the preexisting step, i.e., water separation from the hull and aeration of a portion of the hull, but it also increases the amount of hull unwetting and the speed range over which unwetting occurs. In addition hull lift is increased as the result of the creation of a high pressure area forward of the step.

The improvements to a vessel's efficiency due to additional hull unwetting from the protrusion are due to the diversion of the water flow. When a protrusion is introduced into a flow traveling at moderate to high speeds, the flow will be diverted to follow the protrusion. In the gradual case, such as with a wedge, the flow will release tangentially to the wedge surface. The momentum in the flow will prevent it from reattaching to the hull immediately. The flow will instead reattach further down the hull than it would for a step alone. That is, for the original step, the reattachment point will be closer to the detachment point than in the case of a protrusion into the flow. The reattachment point will vary depending on the speed of the flow, the angle of the wedge and the viscosity of the fluid.

The limiting case of a wedge protrusion is an interceptor or interceptor plate. This is, in effect, a wedge with infinite slope.

Interceptors are flat plates subtending vertically downward from the hull of a vessel such that when the vessel is in operation and water is flowing along the surface of the vessel the interceptors cause a flow stagnation pressure lift to be created on the upstream side of the plate, or just forward of the interceptors.

This higher pressure area causes a vertical force to be developed onto the surface in the region of the vertical plate in the flow stream. In naval architecture and hydrodynamics such vertical plates installed for the purpose of generating vertical force are referred to as interceptors. Interceptors affixed to the underwater body of a vessel when the vessel is underway and having water flow along the underwater body will generate the higher pressure area causing a lifting force on the vessel, and if the interceptors are aft then the force will cause the stern to be raised relative to the bow. The vessel is then said to be trimmed down by the bow. The present invention enables proper placement of the LCG further forward than in conventional boats without detrimental too flat running trims.

As compared to a transom mounted interceptor, an interceptor plate mounted in a hull forward of the transom provides greater lift and reduction of hull immersion and also provides improved trim control forces.

In the case of the interceptor placed in front of a hull step according to the present invention, the flow is not gradually moved away from the hull. Rather, the flow will hit the interceptor plate and stagnate, causing a region forward of the plate where the flow is stationary. At the interceptor, the flow will be stationary for the entire depth of the plate. As one travels forward of the interceptor, the stationary region will become shallower. In essence, this makes a wedge shape of stationary flow. The moving flow will pass over this stationary flow and separate at the plate at an angle tangent to the stagnation zone angle. So, the interceptor plate actually acts very similar to a wedge in terms of creating flow separation.

Similar effects can be achieved by the use of a cambered lifting surface on the bottom of a hull forward of a step. A cambered lifting surface has a trailing edge that is nearly vertical. It acts as a kind of hybrid between a wedge and an interceptor. The lead up to the trailing edge is gradual, as in a wedge, but the trailing edge tangency points downwards as in an interceptor.

The improvements to hull efficiency due to increased lift from the protrusion or interrupter are the result of the incompressibility of water. Because water is incompressible, if it is forced in one direction while surrounded by infinite fluid, the pressure will increase. This increase in pressure will be applied to the surface normal to it, in this case the hull. In the case of a simple shape, like a wedge, the flow is not moved very far or very fast. Therefore, the increases in lift will be small. However, in the case of an interceptor plate, a slightly different behavior occurs. The interceptor is extended into the boundary layer of the hull (the region close to the hull where the water has not yet reached free stream velocity). As a result the flow stagnates forward of the interceptor creating a large high pressure area. Forward of this high pressure area, the flow is diverted as with a wedge. So, the interceptor creates a high pressure area due to the halting of the boundary layer as well as a high pressure area due to the diversion of the flow. A cambered lifting surface diverts the flow similar to a hydrofoil. A small portion of the surface protrudes into the flow at the leading edge, causing a stagnation line. Aft of the stagnation line, the flow is forced to follow a curved surface until the trailing edge. This motion, as with the wedge, increases the pressure under the hull. In the case of the cambered lifting surface, a slight high pressure due to the stagnation line and an increase in pressure due to the diversion lead to a total increase in lift. All three of these shapes (and any other shape protruding into the flow) will generate drag along with lift. If the lift to drag ratio is higher than that of the hull, any increase in lift will lead to a more efficient overall system.

By including protrusions into the flow forward of a step, separation will occur at lower speeds. Because water is incompressible and thus does not like to make sharp turns, by introducing an obstruction, vortices and trailing edge turbulence will be generated. This will help the flow break free of the hull even at moderate speeds.

The prior art has failed to conceive of or recognize the significant increase in vessel efficiency that can be developed by carefully designed use of a flow interrupter like a wedge, interceptor plate or a cambered shape forward of a ventilation step in a planing hull. This combination will reduce the extent of wetted surface, and, in turn, reduce drag on the hull.

The above and other objects, features and advantages of the present invention will become apparent from the following detailed description of illustrative embodiments thereof, which is to be read in conjunction with the accompanying drawings, wherein:

DETAILED DESCRIPTION OF THE PREFERRED EMBODIMENTS

Figure 1A:
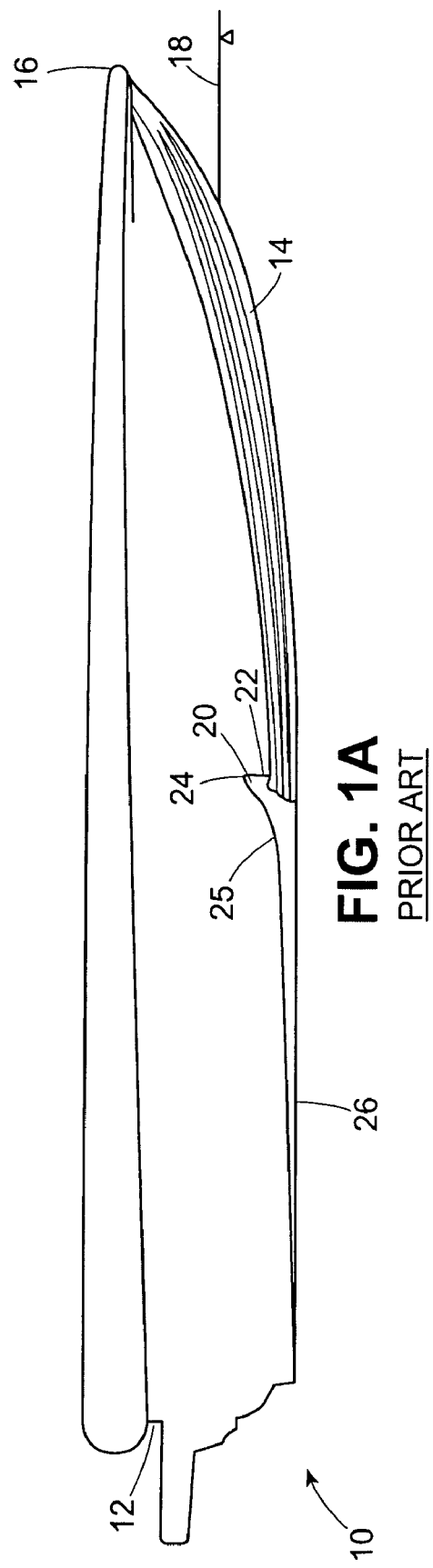
FIG. 1A is a side elevational view of a planing boat hull having a conventional ventilation and unwetting step in its bottom.

Referring now to the drawings in detail, and initially to FIG. 1, a generally conventional boat hull 10 is illustrated which includes a rear transom 12, a hull bottom, planing, or working surface 14 and a bow 16. The hull is shown at rest at an even keel, i.e., without trim, and has a design water line 18. Hull bottom 14 is a planing surface which has a V shaped form in cross-section with deadrise moving aft towards the transom.

Figure 1B:
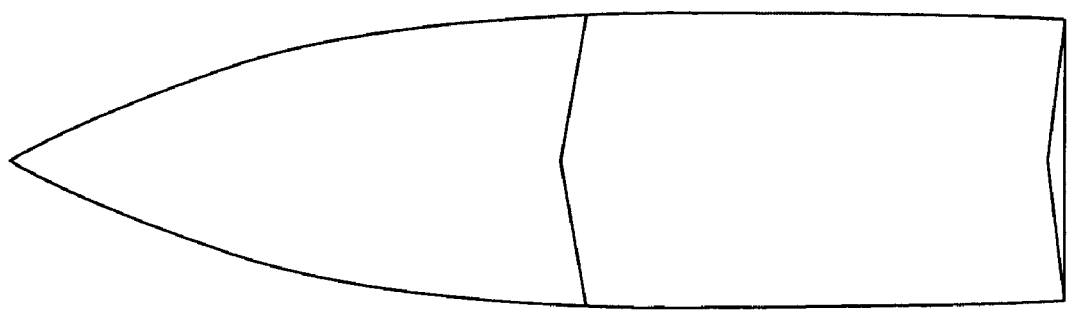
FIG. 1B is a schematic bottom view of the hull of FIG. 1A showing the location of the leading edge of the step.

It has become common in such boats to provide the hull with a step or ventilation channel 20 (sometimes called an aeration channel) in the hull bottom that extends from one side transverse to the keel to the other side. These are either straight across the hull or angled to the keel, as shown in FIG. 1B. Such steps typically have a relatively flat front face 22, a curved top 24 and a tapered aft surface 25 which returns to the keel line 26 aft of the step top 24.

As a boat having a stepped planing surface, as described above, moves through the water on a plane the forward part of the hull rises out of the water and the aft part of the bottom skims or planes on the water surface. A step in such a hull causes the water immediately before it to separate from contact with the hull, effectively unwetting the surface of the hull at and aft of the step. The step allows air to enter the space in the step above the separated water which in turn keeps water out of that space and resists reattachment of the water to the hull. This serves to reduce drag on the hull thereby improving the efficiency of the hull.

Figure 1C:
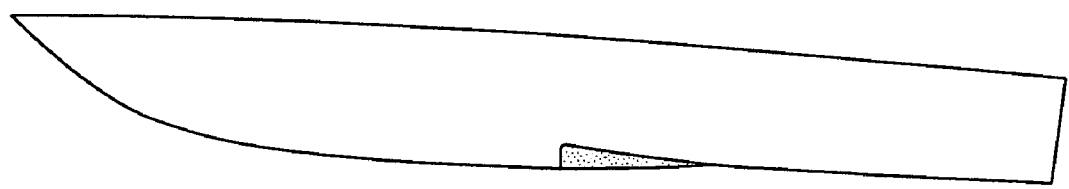
FIG. 1C is a schematic side view of the hull of FIG. 1A showing in the dotted area the ventilation of the hull by the step and the reattachment of the water with the hull aft of the step.

As seen in FIG. 1C, and as shown by the speckled area therein, the hull, aft of the step remains ventilated and water does not reattach until further aft as the surface 25 approaches the keel line.

Figure 2A:
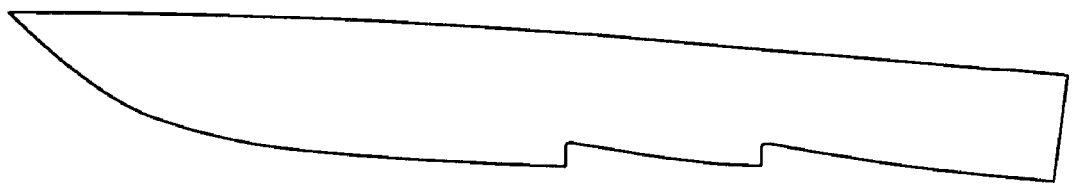
FIG. 2A is a schematic side view of another hull with two steps in its bottom.
Figure 2B:
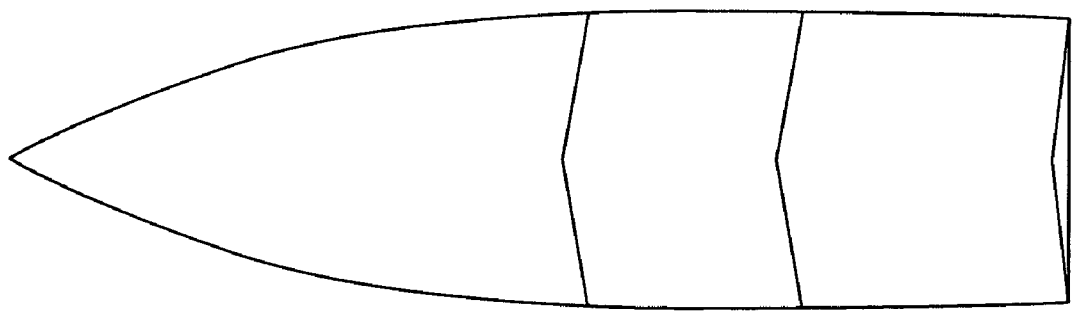
FIG. 2B is a bottom view of the hull of FIG. 2A showing the location of the forward edges of the two steps formed therein.
Figure 2C:
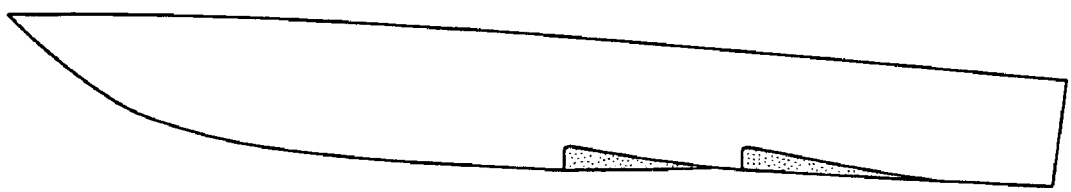
FIG. 2C is a side view similar to FIG. 1C showing in the dotted area the ventilation of the hull by the two steps and the reattachment of the water with the hull after these steps.

Planing hulls of the type just described can have one or multiple steps 20 formed in their hull. A planing hull having two such steps successively positioned on the hull bottom is shown in FIG. 2A. FIG. 2B shows the relative positions of the leading edges of the steps of the boat of FIG. 2A and FIG. 2C shows the water separation and reattachment described above. The use of multiple steps in such hulls provides greater unwetted surface area and increased efficiency.

Typically, in these prior art structures, there is no area of higher pressures on the hull bottom immediately preceding the step. This is because changes in pressure only occur at locations where there is a change in the angular momentum of the flow. Since the hull bottom longitudinal sections immediately preceding the step are typically straight and flat there can be no change to the angular momentum of the flow and hence no increases in hull pressures.

Figure 3A:
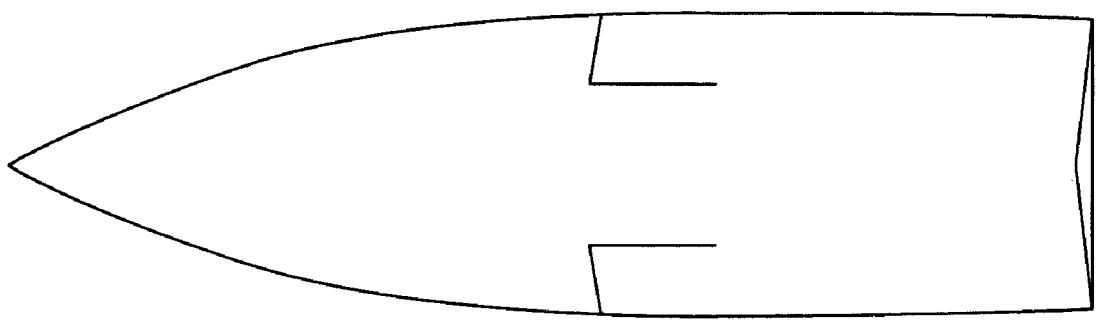
FIG. 3A is a bottom view of another embodiment of the invention, similar to FIG. 1B showing the bottom of a hull where the ventilation steps extend only partly inward from the sides of the boat.
Figure 3B:
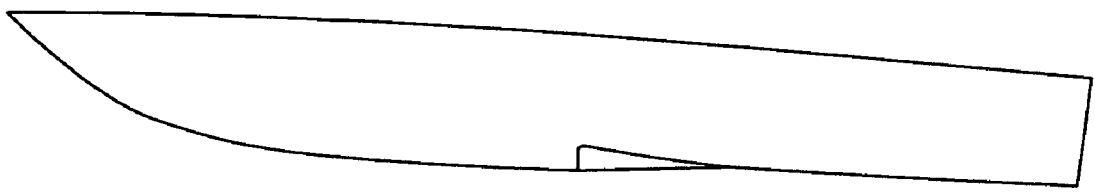
FIG. 3B is a side view similar to FIG. 1C, but for the hull of FIG. 3A with partial ventilation steps.

FIG. 3 shows another form of conventional planing hull where the steps do not extend all across the bottom of the hull, but simply extend part way. These steps function in substantially the same way except they do not decrease the wetted surface area as much as a step that extends entirely across the hull.

As described above, the present invention involves the placement of a protrusion or water flow interrupter immediately forward of a step in the hull bottom. The purpose of the interrupter is to produce increased lifting pressure immediately forward of the step along with increased water separation rearwardly of the step to produce a greater unwetted surface area than the step alone. This protrusion can take several forms, some of which are described hereinafter. These interrupters can be used with any of the hull forms of FIG. 1A, 2A or 3 immediately forward of or at the leading edge of the steps or partial steps shown therein.

Figure 4A:
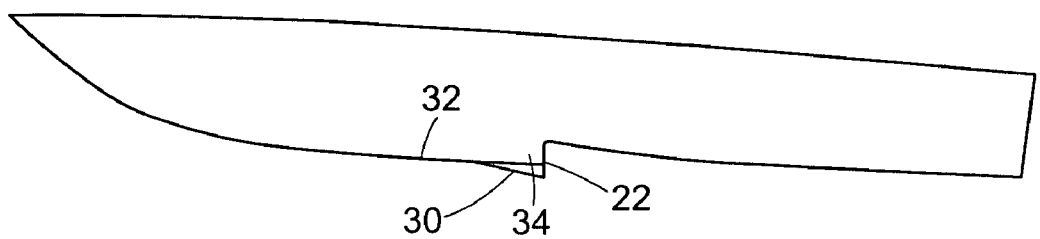
FIG. 4A is a side-elevational view similar to FIG. 1B showing a single stepped hull with a wedge shaped flow interrupter forward of the step.
Figure 4B:
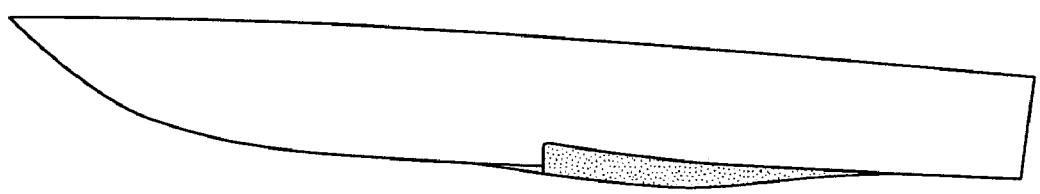
FIG. 4B is a side view similar to FIG. 4A showing the water separation arising from the use of the wedge and the reattachment aft thereof.
Figure 4C:
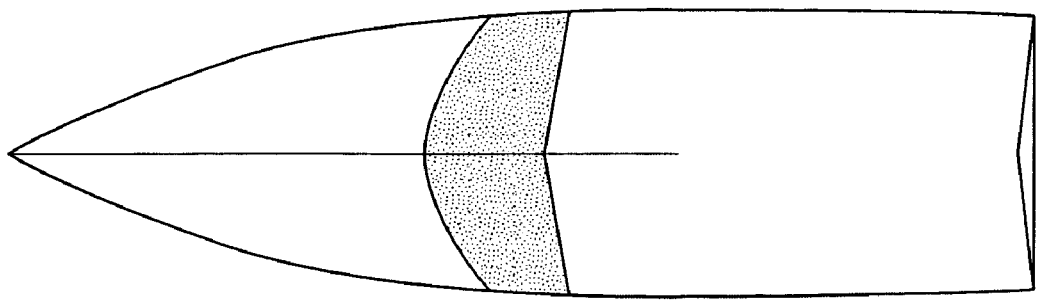
FIG. 4C is a bottom view of the hull of FIG. 4A showing the area of increased lift pressure applied to the hull forward of the step.

Referring now to the embodiment shown in FIG. 4A, a wedge shaped surface area 30 is formed in the hull forward of the step. The wedge tapers downwardly from the keel 32 to the front face 22 of the step all along the leading edge of the step with the result that the front face of the step is slightly larger and its bottom end extends somewhat below the keel line represented by the line in the drawing indicated by the reference numeral 34. This wedge shaped feature extends along the entire bottom of the boat which is intended to be in contact with and facing the water, immediately in front of the step. As a result the water flow along the bottom of the boat in the area forward of the wedge which is in contact with the water surface at operating speeds is diverted to follow the wedge shape. The momentum in the flow prevents the water from reattaching immediately to the hull and, because it is diverted downwardly, the water produces an increased pressure on the hull indicated by the speckled area in FIG. 4C. In addition, because of the greater depth of the protrusion provided by the wedge the separated water will reattach further aft on the hull, as shown in FIG. 4B, than it will with a normal hull, as shown in FIG. 1C.

That reattachment point varies with the speed of the flow, the angle of the wedge, and the viscosity of fluid. Therefore, the boat can be designed with a wedge that will optimally produce efficiency at its design operating speeds.

Another form of interrupter suitable for use with the present invention is a so-called interceptor plate, such as is disclosed in U.S. Pat. No. 6,006,689. This plate is also shown in greater detail in FIG. 5D of the application.

Figure 5A:
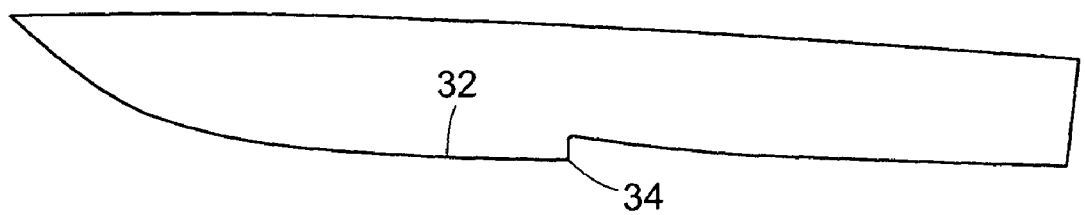
FIG. 5A is a schematic side view similar to FIG. 4A but showing an interceptor plate used as an interrupter forward of the step.
Figure 5B:
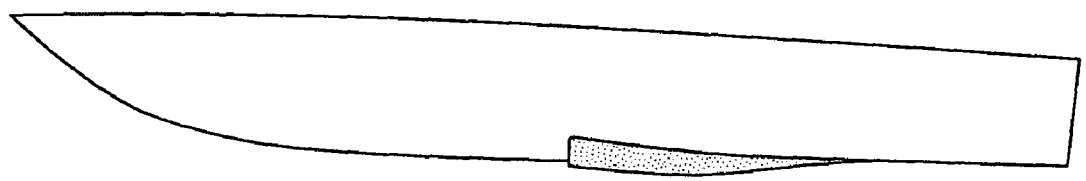
FIG. 5B is a side view similar to FIG. 5A showing the water separation arising from the use of the interceptor and the reattachment of the water to the hull.
Figure 5C:
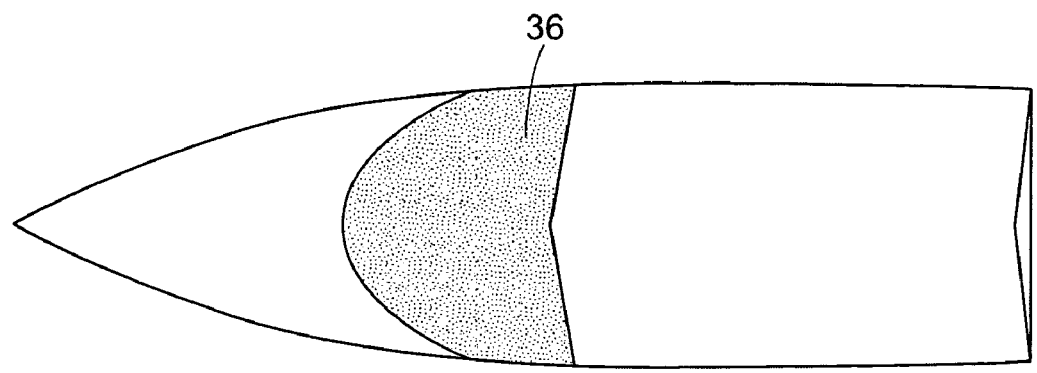
FIG. 5C is a bottom view of the hull of FIG. 5A showing the area of increased lift pressure applied to the hull forward of the interceptor plate.
Figure 5D:
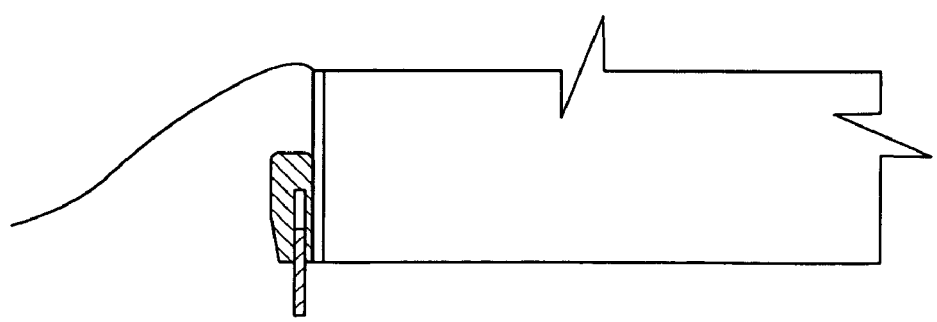
FIG. 5D is an enlarged view of a step and interceptor plate structure for the hull of FIG. 5A.

This interceptor plate is an elongated flat plate mounted at the front of the step to extend below the keel line 32 of a vessel as shown in FIG. 5A. The interceptor plate 34 can be a fixed plate of a selected depth or height, for example, ½ inch to 1 inch, or it can be a movable plate as shown in FIG. 5D that can be retracted or extended to the desired depth. The interceptor plate acts much like the wedge described with respect to FIG. 4A, but the flow in front of the plate is not moved gradually away from the boat as it is with the wedge. Rather the water passing under the boat at speed stagnates against the plate causing the water forward of the plate to form a stationary body of water much like a wedge. This stationary region becomes shallower, i.e., is closer to the hull, as one moves forward. The surrounding flowing water will pass over this stationary wedge shaped body of stagnated water and separate from the hull at the bottom of the plate at an angle which is tangent to the stagnation zone angle. Because of the stagnation zone, higher lift pressure is created against the bottom of the hull shown in a more densely stippled area 36 in the bottom view of FIG. 5C. With the embodiment of FIG. 4A, the interceptor plate forms an enlarged ventilated area aft of the step before the water reattaches to the hull.

In another embodiment, the interceptor plate can be raised and lowered in its housing in any convenient manner, as for example by electromagnetic devices or hydraulic rams or the like.

The use of an interrupter, and particularly an interceptor plate allows the trim characteristics of a hull to be fine tuned. It is a tool that is easily installed on an existing hull which can improve seakeeping by balancing movements without loss in efficiency.

Figure 6A:
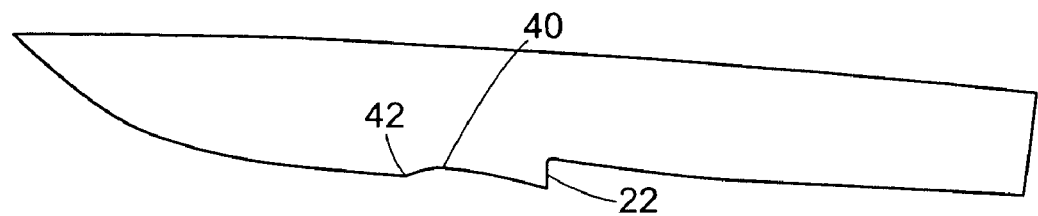
FIG. 6A is a schematic side view of another hull with a chambered lifting surface forward of the step in the hull.
Figure 6B:
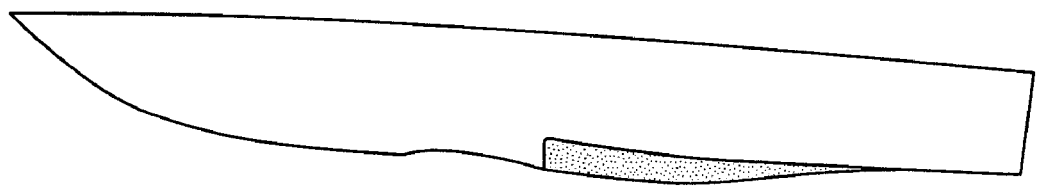
FIG. 6B is a side view similar to FIG. 6A showing the water separation arising from the use of the cambered lifting surface and the reattachment of the water to the hull.
Figure 6C:
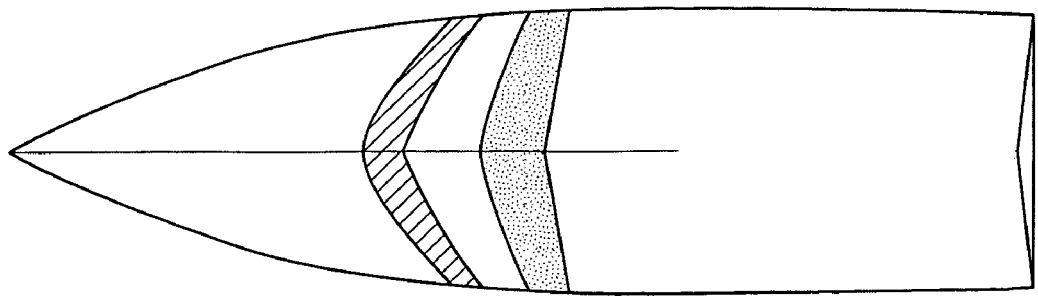
FIG. 6C is a bottom view of the hull of FIG. 6A showing the areas of increased pressure applied to the hull at the cambered surface and immediately forward of the step.

Yet another way of implementing the present invention is shown in FIGS. 6A-6C in which a cambered surface 40 is formed in the bottom of the hull which takes the general shape of the top of an air foil. The cambered lifting surface is concave relative to the water and its trailing end ends at the bottom of the step 22. Using a cambered lifting surface in this way, when the vessel is in motion a first area of moderate high pressure indicated by the lightly dotted area of FIG. 6C is created in front of the leading edge of the cambered surface. Some separation of the water may occur at the leading edge of the camber as well to produce an unwetted surface within the camber. However the water reattaches rapidly against the camber forward of the step 22 and produces a higher pressure zone in front of the step much in the way that that occurs with the wedge of FIG. 4A. However, because the trailing edge tangency is greater in the downward direction than with the wedge, the pressure area produced in greater.

As a result of the use of interrupters of the type described immediately in front of a step in a hull, hull efficiency is increased due to increased lift from the protrusion or interruption as described above. The protrusions produce the water separation at lower speeds than the step alone, producing greater unwetted surfaces and improved lift in front of the interrupter.

While several specific arrangements of vertical flow interrupters have been disclosed herein, multiple other configurations of such interrupters with steps in hulls are possible. Various different arrangements for distribution of the interrupters relative to the size, shape and number of steps may lead to an optimal arrangement for one particular hull as compared to another. Each arrangement has different benefits and can reflect aggressive or conservative approaches in improving hull performance. Thus there can exist different combinations of steps going all the way across or part way across the hull with the interrupter going all the away across the hull or just part way. For example:

a. Steps all the way across the hull and interrupters all the way across;

b. Steps all the way across the hull and interrupters part way; and c. Steps part way across the hull and interrupter part way.

Although an illustrative embodiment has been described herein with reference to the accompanied drawings, it is to be understood that this invention is not limited to these precise embodiments, but that various changes in modifications might be affected therein by one skilled in the art without departing from the scope or spirit of the invention.

What is claimed is:

1. A watercraft hull having a pair of side walls, a bottom planing surface extending therebetween and at least one ventilation step formed in at least a part of its bottom planing surface facing the water and opened to the air through at least one of the side walls to allow air to enter the step causing water to separate from the hull, said step being located such that the water separated from the hull at the step reattaches to the bottom planing surface a distance aft of the step to produce lift on the hull; said step having a forward edge portion, and means for forming a water flow interrupter projecting downwardly from the hull forward of said forward edge of the step to change the center of pressure on the bottom planing surface of the hull from where it would have been without said means.

2. A watercraft hull as defined in claim 1, wherein said at least one step extends from one side of the hull to the other and is open to the air at both side walls.

3. A watercraft hull as defined, in claim 1, wherein said at least one step comprises a pair of partial steps respectively located adjacent opposite longitudinal sides of the hull.

4. A watercraft hull as defined in claim 1, wherein said at least one step comprises a plurality of transverse ventilation steps in the hull.

5. A watercraft hull as defined in any of claims 1 to 4, wherein said means for forming a water flow interrupter is a flat wedge shaped protrusion on said hull bottom, which extends from the surface of the bottom planing surface forward of the step downwardly towards the step.

6. A watercraft hull as defined in any of claims 1 to 4, wherein said means is a flat interceptor plate mounted on the hull.

7. A watercraft hull as defined in claim 4, wherein said interceptor plate is mounted on the hull for vertical movement between a first retracted position in the hull and a second fully extended position.

8. A watercraft hull as defined in any of claims 1 to 4, wherein said means comprises a concave cambered surface area formed in said hull bottom forward of the step which is at or below the waterline during operation of the watercraft to produce separation of water at the leading edge of the camber and unwetted surface area in the camber.

9. A watercraft monohull having a pair of side walls and a bottom surface extending therebetween for planing on water, said bottom surface having at least one ventilation step formed therein, said ventilation step comprising a recessed cavity in the hull bottom opening downwardly towards the water and having a forward leading edge portion joining the hull bottom, said step being open to the air through the side walls to allow air to enter the step when the hull is planing to cause water to separate from the hull to reduce friction on the hull; said step being located such that the water separated from the hull at the step reattaches to the bottom planing surface a distance aft of the step to produce lift on the hull; and water flow interrupter means projecting downwardly from the hull forward of said forward edge of the step for increasing the separation of water from the hull at and aft of said step thereby increasing the unwetted surface area of the hull bottom during operation of the watercraft and increased lift pressure forward of the step.

10. A watercraft hull as defined in claim 9 wherein said recess has a forward wall portion at the leading edge of the step which is generally perpendicular to the hull bottom, a curved top wall and a tapered aft surface which extends from the curved to the keel line of the hull aft of the step.

11. A watercraft hull as defined in claim 9, wherein said at least one step comprises a plurality of transverse ventilation steps in the hull.

12. A watercraft hull as defined in any of claims 9, 10 and 11, wherein said means is a flat wedge shaped fixed protrusion on said hull bottom which extends from a forward end thereof on the hull bottom, forward of said step, aft to a rear end at said leading edge of said step which projects down into the water further than said forward end.

13. A watercraft hull as defined in any of claims 9, 10 11, wherein said means comprises a flat interceptor plate mounted on said hull bottom at or immediately forward of said leading edge of the ventilation step.

14. A watercraft hull as defined in claim 13, wherein said interceptor plate is mounted for vertical movement between a first retracted position in the hull and a second fully extended position.

15. A watercraft hull as defined in any of claims 9, 10 11, wherein said means comprises a concave cambered surface area formed in said hull bottom forward of said step which is at or below the waterline during operation of the watercraft to produce separation of water at the leading edge of the camber and unwetted surface area in the camber.

* * * * *